Patented Sept. 12, 1950

2,521,758

UNITED STATES PATENT OFFICE 2,521,758

INSOLUBLE SALTS OF PENICILLIN

Anthony L. Tosoni and Peter J. Moloney, Toronto, Ontario, Canada, assignors to The Governors of the University of Toronto, Toronto, Ontario, Canada No Drawing. Application November 27, 1948, Serial No. 62,428

13 Claims. (Cl. 260—302)

1

This invention relates to salts of penicillin with esters of the amino acids tyrosine and phenylalanine. This application is a continuation-in-part of our prior co-pending application Serial No. 24,685, filed May 1, 1948, now abandoned.

It is an object of our invention to prepare penicillin compositions which produce a concentration of penicillin in the blood at a therapeutically effective level for a period longer than that which obtains following the administration of unmodified penicillin. It is also an object of our invention to provide a penicillin compound which has no objectionable taste. It is also an object of our invention to provide relatively insoluble salts of penicillin which in addition to their persistent therapeutic effect, also have the advantage that they may be formed from solutions and readily separated therefrom to recover the penicillin.

In accordance with our invention salts are formed between penicillin and esters of the amino acids tyrosine (another name for which is α-amino-β-p-hydroxyphenyl propionic acid) and phenylalanine (other names for which are α-amino-β-phenyl-propionic acid and β-phenyl-α-alanine). Such salts may be prepared by mixing acid penicillin with the ester of the amino acid, in organic solution, and the salt may be recovered from the organic solution, as by evaporating part or all of the solvent. With esters which have suitable stability in aqueous solution, we may prepare the desired penicillin salt in aqueous medium by mixing a salt, for example, a hydrochloride, of the amino acid ester with a soluble penicillin salt, such as potassium, sodium, or ammonium penicillin, in aqueous solution at about pH 6. Upon such mixing, the desired salt of penicillin with the amino acid ester precipitates, and this is recovered from the supernatant liquid, as by filtration.

The penicillin embodied in the salt may be a mixture of one or more of the several specific penicillins such as are commonly obtained in the production of penicillin, or may be a penicillin which consists mainly or wholly of one specific penicillin. Preferably, we use a penicillin which is rich in penicillin G. The penicillin used may be either an amorphous penicillin or, preferably, a crystalline penicillin. In preparing our new salts of penicillin we preferably start with a dry penicillin of considerable purity, but we may use a solution containing the penicillin, as when we form the new penicillin salts as a step in the recovery of penicillin.

Esters which may be used to form salts of penicillin are aliphatic esters of the amino acids tyrosine and phenylalanine, more specifically the

2 lower alkyl esters of such amino acids, and preferably the esters formed between such amino acids and normal lower alkyl alcohols. For therapeutic use we desirably use salts of penicillin with esters of the amino acids in which the esterifying radical is an alkyl radical containing from 2 to 6 (inclusive) carbon atoms.

We may, of course, have more than one of the amino acid esters present at any one time. We designate the penicillin salts formed as, for example, ethyl-tyrosine penicillin, ethyl-phenylalanine penicillin, n-propyl-tyrosine penicillin, n-propyl-phenylalanine penicillin, n-butyl-tyrosine penicillin, n-butyl-phenylalanine penicillin, n-amyl-tyrosine penicillin, n-amyl-phenylalanine penicillin, etc.; and, of course, we may have mixtures of the ester penicillin salts and mixtures including various amounts of otherwise modified or unmodified penicillin.

The penicillin salts of our invention may be represented by the following general formula:

(1) 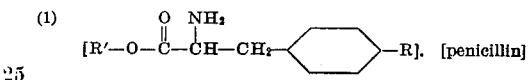

in which R may be the hydroxyl radical (when the amino acid is tyrosine) or hydrogen (when the amino acid is phenylalanine), and R' represents an aliphatic radical, preferably a lower alkyl radical, and most preferably an n-alkyl radical containing from 2 to 6 carbon atoms.

In preparing our penicillin salts we may start with an aqueous solution containing penicillin. This may be a solution prepared by dissolving a relatively pure penicillin salt in aqueous medium, or it may be an aqueous solution obtained by any other convenient means, as by extraction from some other composition of penicillin. A salt of the amino-acid ester, for example, the amino-acid-ester hydrochloride, is dissolved in an aqueous medium, such as an aqueous buffer or water. The acidity of the two aqueous solutions is desirably such that when they are mixed an acidity of about pH 6 is obtained. The two aqueous solutions are mixed with stirring. A precipitate forms comprising the desired salt of penicillin with the amino-acid ester.

When the initial penicillin used is of relatively high purity, the precipitate is usually a crystalline material, either immediately upon forming or within a short time thereafter. The salt produced may be recrystallized, if desired. The finished dried ester-salt of penicillin may be used as such, as for oral administration in the form on a powder, or in tablets or capsules, or may be embodied in compositions, as in injectible compositions for parenteral administration.

The following are examples of our invention:

Example 1.—n-Amyl-tyrosine penicillin

The tyrosine ester hydrochloride used in the preparation of this product may be produced as follows:

Dried hydrogen chloride gas is bubbled through 300 cc. of n-amyl alcohol until the alcohol has absorbed about 15 gm. of hydrogen chloride. To this solution 20 gm. of 1(-)-tyrosine are added and the mixture is heated under a reflux condenser for about half an hour. At the end of this time the material is distilled until approximately 150 cc. of distillate have been removed. The material remaining in the distilling flask is then allowed to cool. Upon such cooling a crystalline precipitate forms comprising the hydrochloride of the n-amyl-ester of tyrosine. This precipitate is removed by filtration, washed with amyl alcohol and then with ether and dried.

3.86 gm. of the hydrochloride of the n-amyl-ester of tyrosine prepared as described above or by any other suitable method are dissolved in 30 cc. of aqueous citrate-sodium hydroxide buffer having an acidity of approximately pH 7.5. 5.0 gm. of potassium penicillin-G having a potency of approximately 1500 units per mg. are dissolved in 10 cc. of an aqueous citrate-sodium hydroxide buffer having an acidity of approximately pH 7.5. The two solutions are mixed with stirring. Upon such mixing a precipitate forms. The acidity of the supernatant liquid is about pH 6. Part of this precipitate at first may be non-crystalline but upon standing the precipitate becomes crystalline. This precipitate is the desired n-amyl-tyrosine penicillin—the salt of penicillin with the n-amyl-ester of tyrosine. The n-amyl-tyrosine penicillin may be represented by the following formula:

(2)
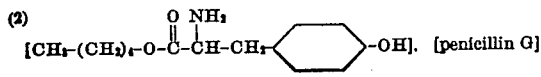
[CH₃-(CH₂)₄-O-C(=O)-CH(NH₂)-CH₂-⟨⟩-OH]. [penicillin G]

The precipitate is recovered by filtration, washed with water and dried. The amount recovered is about 7.3 gm. The crystalline material has a potency of about 900 units per mg. and is obtained in a yield of about 90% based on the original potency of the penicillin used.

Example 2.—Ethyl-tyrosine penicillin 2.8 gm. of the hydrochloride of the ethyl ester of tyrosine are dissolved in 10 cc. of water. 4.0 gm. of potassium penicillin-G having a potency of approximately 1500 units per mg. are dissolved in 20 cc. of an aqueous citrate-sodium hydroxide buffer having an acidity of approximately pH 7.5. The two solutions are mixed with stirring. Upon standing a crystalline precipitate forms. This crystalline precipitate is the desired salt of penicillin with the ethyl ester of tyrosine, which salt may be represented by the following formula:

(3)
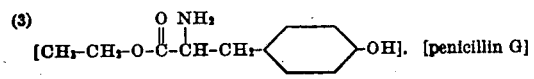
[CH₃-CH₂-O-C(=O)-CH(NH₂)-CH₂-⟨⟩-OH]. [penicillin G]

The precipitate is recovered by filtration, washed with water, and dried. The amount recovered is about 5.0 gm. The crystalline material has a potency of about 900 units per mg. and is obtained in a yield of about 75% based upon the original potency of the penicillin used.

Example 3

The preceding examples are repeated, save that instead of the ethyl- or n-amyl-tyrosine ester hydrochloride of Examples 1 and 2, we use n-hexyl tyrosine ester hydrochloride. A solution of 2.0 g. of crystalline potassium penicillin G in 5.0 ml. of 0.2 M acetate buffer is mixed with a solution of 1.58 g. of n-hexyl tyrosine ester hydrochloride in 10 ml. of 0.2 M acetate buffer. A viscous precipitate forms, which solidifies on standing. This is washed with water and dried, and yields about 2.53 g. of material assaying about 960 units per mg., and comprising n-hexyl tyrosine penicillin having the formula:

(4)
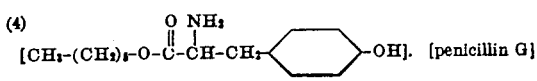
[CH₃-(CH₂)₅-O-C(=O)-CH(NH₂)-CH₂-⟨⟩-OH]. [penicillin G]

Example 4.—n-Amyl-tyrosine penicillin

A solution of 2 gms. of potassium penicillin G having a potency of about 1500 units per ml., in 20 cc. of water, is mixed with 30 cc. of amyl acetate and 4.2 cc. of 10% phosphoric acid. The mixture is shaken, and allowed to separate into two layers. The aqueous layer has an acidity of approximately pH 2.4. The amyl acetate layer is separated from the mixture, and contains the penicillin in acid form.

A solution of 1.54 gm. of amyl tyrosine ester hydrochloride in 3 cc. of water is mixed with 20 cc. of amyl acetate and 1.8 cc. of 5 N. potassium carbonate. The mixture is shaken, and allowed to separate into two layers. The aqueous layer has an acidity of approximately pH 8.4. The amyl acetate layer, containing the amyl tyrosine, is separated from the mixture.

The amyl acetate solutions of penicillin and of amyl tyrosine ester are mixed and cooled in the refrigerator. A white crystalline precipitate forms, consisting of amyl tyrosine penicillin, of Formula 2 above. This crystalline precipitate is recovered, washed with either, and dried. It is obtained in a yield of about 2.45 gms., and assays about 1010 units per mg.

Example 5.—Ethyl-dl-phenylalanine penicillin

The dl-phenylalanine ethyl ester hydrochloride used in this example may be produced as follows:

Dried hydrogen chloride gas is bubbled through 90 cc. of commercial absolute ethyl alcohol until the alcohol has absorbed about 24 gm. of hydrogen chloride. To this solution 6.0 gm. of dl-phenylalanine (available commercially from Dow Chemical Co.) are added and the mixture is heated under a reflux condenser for about half an hour. Any undissolved residue is removed by filtration, and the filtrate is evaporated almost to dryness in vacuo. The residue from such evaporation is washed with diethyl ether, filtered, and air dried. This yields about 6.75 gm. of the desired dl-phenylalanine ethyl ester hydrochloride, which melts at 122° C.

6.15 gm. of this hydrochloride are dissolved in 20 cc. of 0.2 M aqueous sodium acetate buffer (pH 6.5). 10 gm. of potassium penicillin-G having a potency of approximately 1500 units per ml. are desolved in 50 cc. of 0.2 M aqueous sodium acetate buffer (pH 6.5). The two solutions are mixed with stirring. Upon such mixing a white crystalline precipitate forms, which is the desired ethyl-dl-phenylalanine salt of penicillin, which salt may be represented by the following formula:

(4) 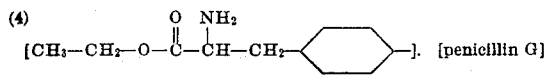 . [penicillin G]

The precipitate is recovered by filtration, washed with water and dried. In a typical run of this example, the product was obtained in a yield of 10.7 gm. and melted at 106° C. with decomposition. Assay indicated a potency of 1190 units per mg. (theoretical potency 1126 units per mg.).

*Example 6.—Ethyl-1-phenylalanine penicillin*

The 1-phenylalanine ethyl ester hydrochloride used in this example may be prepared by the procedure set forth in Example 5, using 90 cc. of commercial absolute alcohol, 18 gm. of hydrogen chloride, and 3.6 gm. of 1-phenylalanine. The 1-phenylalanine ethyl ester hydrochloride is obtained as a white crystalline material, melting at 151° C., in a yield of about 3.5 gm.

Following the procedure of Example 5, a solution of 1-phenylalanine ethyl ester hydrochloride in aqueous sodium acetate buffer (pH 6.5) is mixed with a solution of potassium penicillin-G in aqueous sodium acetate buffer (pH 6.5), with stirring. A white crystalline precipitate separates from the mixture, and is the desired ethyl-1-phenylalanine penicillin. This is recovered by filtration, washed with water, and dried. Dried material so obtained melted at 125° C. with decomposition, and assayed 1058 units per mg. (theoretical potency 1126 units per mg.).

*Example 7.—n-Amyl-phenylalanine penicillin*

Example 4 is repeated save that instead of using amyl tyrosine ester, we use amyl phenylalanine ester, so that the penicillin salt obtained is amyl phenylalanine penicillin, which salt may be represented by the following formula:

(5) 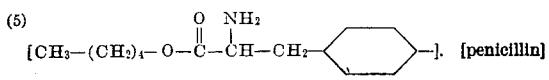 . [penicillin]

*Example 8*

Examples 4 and 7 may be repeated save that instead of using the amyl ester of the amino acid we may use other lower alkyl esters of the amino acid, in which case the salts produced are the penicillin salts of the alkyl amino-acid ester used. Thus we may prepare for example, ethyl tyrosine penicillin, ethyl phenylalanine penicillin, n-propyl tyrosine penicillin, n-propyl phenylalanine penicillin, n-butyl tyrosine penicillin, n-butyl phenylalanine penicillin, etc. Also, instead of using the specific penicillin-G which was used in Examples 4 and 7, we may use other penicillins or mixtures of penicillins, in which case the salts produced are salts of the penicillin or mixture of penicillins which is used.

*Example 9*

Any of Examples 1 to 3, 5, and 6 may be repeated save that instead of using potassium penicillin-G, other soluble salts of penicillin-G are used, such as the sodium salt or the ammonium salt of penicillin-G; or instead of using a salt of the specific penicillin-G, salts of other penicillins or mixtures of penicillins are used. The products obtained in such cases are salts of the amino-acid ester with the penicillin used, or where mixed penicillins are used, such products are mixed salts of the amino-acid ester with the several penicillins in the mixture.

The salts formed between the amino-acid esters and penicillin may be employed therapeutically for the antibiotic effect of the penicillin. Such salts may be administered orally as such, as by admixture with water or other non-toxic liquid, and may be prepared and distributed for oral use in dry form, with or without added buffer or other agents and with or without excipients, as a powder or in capsules or in compressed form as tablets.

For parenteral administration, we prepare therapeutic compositions embodying the salt of an amino acid ester with penicillin, or a mixture of such salts, in combination with an injectible menstruum. The amino-acid ester penicillin is dispersed as a suspension in the injectible menstruum, in a particle size suitable to pass through a convenient hypodermic needle, and the composition may or may not contain one or more suspending agents. Intramuscular administration of such compositions produces a persistent concentration of penicillin in the blood at a therapeutically effective level, for a period longer than that which obtains following the corresponding administration of unmodified penicillin.

The following are examples of compositions for intramuscular administration.

*Example 10* n-Amyl-tyrosine penicillin, such as that produced in Example 1 above, and having a potency of about 900 units per mg., and in a finely divided state, is put up in vials each containing about 350 mg. of the dry material, (about 300,000 units of penicillin). A second vial is combined with each of the vials containing the n-amyl-tyrosine penicillin and such second vial contains about 1 or 2 cc. of aqueous menstruum. Shortly before administration, a menstruum-containing vial is emptied into a vial containing the n-amyl-tyrosine penicillin and the mixture is shaken to produce a suspension. The suspension is taken up in a hypodermic syringe and is administered by intramuscular injection. Such administration produces a persistent concentration of penicillin in the blood at a therapeutically effective level, for a period substantially longer than that which results from the corresponding administration of 300,000 units of unmodified penicillin.

*Example 11*

Crystalline ethyl-tyrosine penicillin-G, having a potency of about 900 units per mg., and in a state of fine division, is suspended in dry sterile vegetable oil, for example sesame oil, in a proportion of about 350 mg. per cc. of the mixture, which provides a potency of about 300,000 units of penicillin-G per cc. This suspension is packaged for distribution in suitable vials, such as the usual 10 cc. multiple-dose vials or 1-cc. single-dose vials. For administration, a suitable quantity of the suspension, say 1 cc., is withdrawn into a hypodermic needle, and administered by intramuscular injection. Such administration produces a prolonged penicillin effect, to maintain a therapeutically effective blood level for substantially longer periods than result from the corresponding administration of equal doses of unmodified penicillin.

*Example 12*

Instead of the aqueous menstruum of Example 10, or the simple oily menstruum of Example 11, we may use other injectible menstruums, for example other oily menstruums, or mixed menstruums, such as oil and water emulsions; and the compositions may contain other agents, such as agents which provide desired concomitant therapeutic action or which prolong or modify the therapeutic action of the penicillin or facilitate its administration.

We claim as our invention:

1. A salt of penicillin represented by the formula

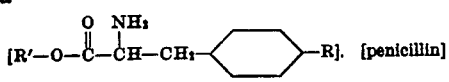

in which R is a substituent of the class consisting of hydrogen and hydroxyl, and in which R' represents an alkyl radical containing from 2 to 6 carbon atoms.

2. A salt of penicillin with an alkyl ester of tyrosine in which the alkyl radical contains from 2 to 6 carbon atoms.

3. A salt of penicillin with the ethyl ester of tyrosine.

4. A salt of penicillin with an amyl ester of tyrosine.

5. A salt of penicillin with an alkyl ester of β-phenyl-α-alanine in which the alkyl radical contains from 2 to 6 carbon atoms.

6. A salt of penicillin with the ethyl ester β-phenyl-α-alanine.

7. A salt of penicillin with an amyl ester of β-phenyl-α-alanine.

8. A salt of penicillin represented by the formula

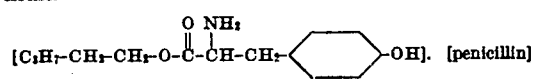

9. A salt of penicillin represented by the formula

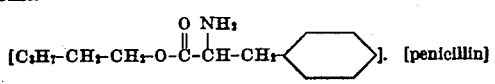

10. The process of preparing a penicillin compound which comprises bringing together in solution penicillin and an alkyl ester of an amino acid of the class consisting of tyrosine and phenylalanine, in which the alkyl radical has from 2 to 6 carbon atoms, to form a salt of the penicillin with the amino acid ester, and recovering such salt.

11. The process of preparing a penicillin compound, which comprises bringing together in aqueous solution a penicillin and an alkyl ester of an amino acid of the class consisting of tyrosine and phenylalanine, in which the alkyl radical has from 2 to 6 carbon atoms, to precipitate from the reaction mixture a salt of the penicillin with the amino acid ester, and recovering the precipitate.

12. The process of preparing a penicillin compound, which comprises bringing together in solution penicillin and an alkyl ester of tyrosine in which the alkyl radical has from 2 to 6 carbon atoms, to form a salt of the penicillin with the tyrosine ester, and recovering such salt.

13. The process of preparing a penicillin compound, which comprises bringing together in aqueous solution a penicillin and an alkyl ester of tyrosine in which the alkyl radical has from 2 to 6 carbon atoms, to precipitate from the reaction mixture a salt of the penicillin with the alkyl tyrosine ester, and recovering the precipitate.

ANTHONY L. TOSONI.
PETER J. MOLONEY.

REFERENCES CITED

The following references are of record in the file of this patent:

"J. Am. Pharm. Assn.," August 1946 (Pract. Pharm. ed.), p. 363.

"Drug and Cosmetic Industry," November 1947, p. 595.

British Report, CMR-Br. 234 (PB 79,927), December 5, 1947 (received in U. S. April 18, 1946), pages 1 to 4.